(No Model.)
J. A. W. JUSTI.
MACHINE FOR MIXING GRAIN OF DIFFERENT SIZES.
No. 267,219. Patented Nov. 7, 1882.
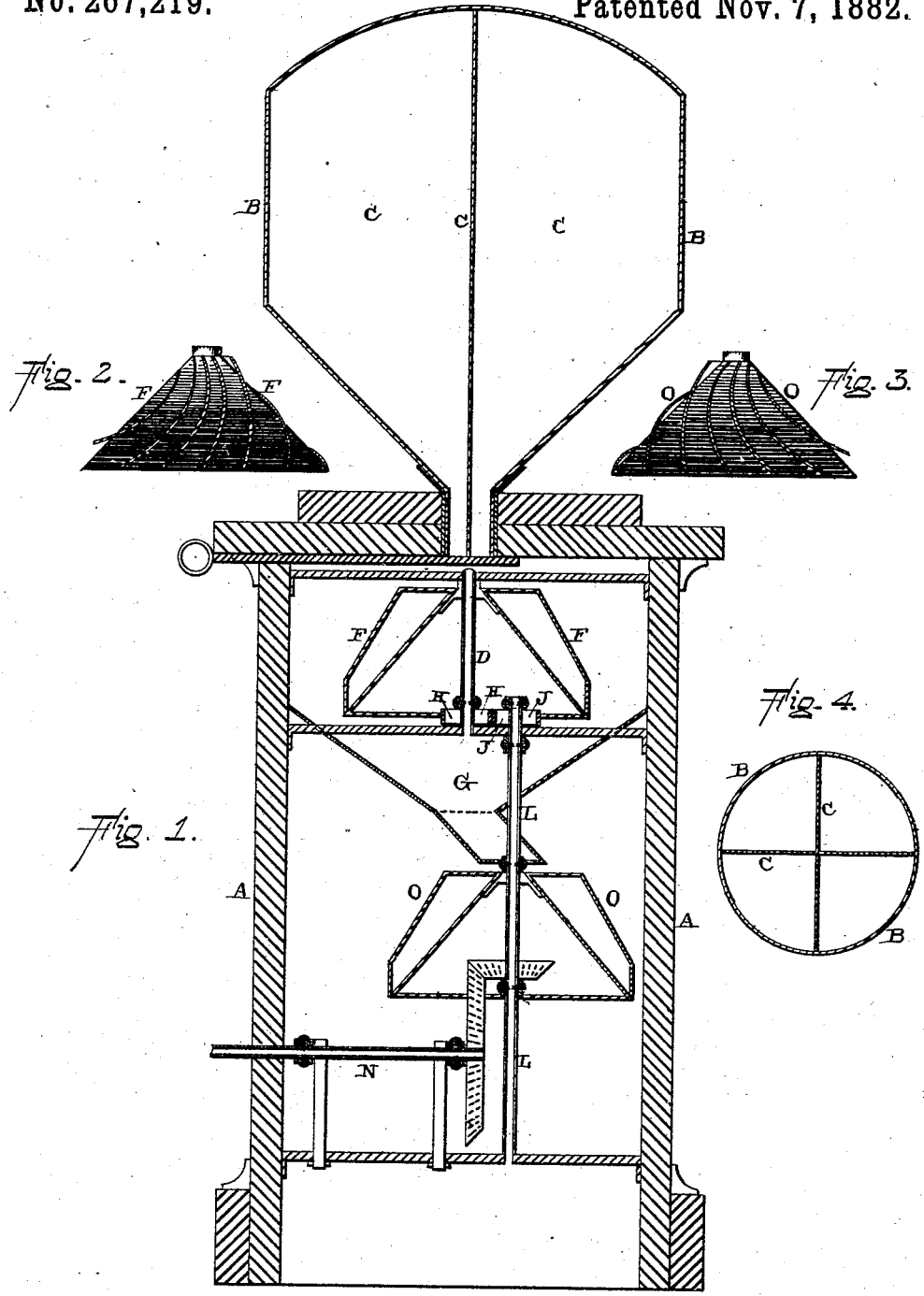
Witnesses —
Louis F. Gardner
W. H. Kern
— Inventor. —
J. A. W. Justi
per
F. A. Lehmann, Atty.

UNITED STATES PATENT OFFICE.

J. AUGUST W. JUSTI, OF CHARLESTON, SOUTH CAROLINA.

MACHINE FOR MIXING GRAIN OF DIFFERENT SIZES.

SPECIFICATION forming part of Letters Patent No. 267,219, dated November 7, 1882.

Application filed September 11, 1882. (No model.)

*To all whom it may concern:*

Be it known that I, J. A. W. JUSTI, of Charleston, in the county of Charleston and State of South Carolina, have invented certain new and useful Improvements in Machines for Mixing Grain of Different Sizes; and I do hereby declare the following to be a full, clear, and exact description of the invention, such as will enable others skilled in the art to which it pertains to make and use it, reference being had to the accompanying drawings, which form part of this specification.

My invention relates to an improvement in machines for mixing rice; and it consists in the combination of a hopper, two oppositely-revolving wheels which are placed one above the other, a suitable inclosing frame, and an operating mechanism, as will be more fully described hereinafter.

The object of my invention is to produce a machine which will take different grades of rice or other grain and mix them evenly and thoroughly together.

Figure 1 is a vertical section of a machine which embodies my invention. Figs. 2, 3, 4 are detail views of the same.

A represents a suitable frame, upon the top of which is placed the hopper B, which may be of any shape that may be preferred. This hopper is divided vertically into a number of divisions by the partitions C, which extend all the way down through the hopper, so as to prevent the grain from becoming mixed in the hopper itself. The flow of grain from this hopper is controlled by a suitable slide or valve of any kind.

Secured to the short shaft D, which is journaled in suitable bearings in the top of the frame A, is the wheel F, which has circular ribs formed upon its top, as shown in Fig. 2, and which ribs serve to hold the grain until it has reached near the bottom of the wheel, where it is thrown outward with considerable force against the sides of the frame, from which point it rebounds and falls into the hopper G below.

On the lower end of the shaft D is placed a pinion or wheel, H, which meshes with the wheel J on the vertical shaft L, which may be operated through the shaft N by any suitable power. On this shaft L is secured a second wheel, O, which revolves in the opposite direction from the wheel above it. The grain runs upon this second wheel, and is thrown from it the same as from the other one. This sudden reversal of the current of the grain, and then throwing it against the sides of the frame, serves to mix the different sizes very thoroughly together. After the grain leaves the lower wheel it may be run into any desired receptacle prepared for it.

I claim—

In a machine for mixing grain of different sizes, the combination of the hopper, two oppositely-revolving wheels having ribs on their tops, an inclosing frame, and an operating mechanism, substantially as shown.

In testimony whereof I affix my signature in presence of two witnesses.

J. AUGUST W. JUSTI.

Witnesses:
F. M. HEISSENBUTTEL,
L. W. SCHEIBE.